3,216,794
PROCESS FOR PRODUCING CRYSTALLINE ALUMINA
Steven John Roschuk, Fonthill, Ontario, Canada, assignor to Norton Company, Worcester, Mass., a corporation of Massachusetts
No Drawing. Filed Oct. 20, 1961, Ser. No. 146,445
6 Claims. (Cl. 23—142)

This invention relates to the production of a high purity aluminum oxide abrasive.

Crystalline aluminum oxide, $Al_2O_3$, has long been known and used as an abrasive material. Although crystalline aluminous abrasives occur in nature—e.g. as corundum, the natural sources are relatively unimportant compared to synthetically produced crystalline alumina. Such abrasives are produced by the fusion of alumina containing materials such as bauxite.

One prior art process for making high purity alumina abrasive is divided into two distinct and separate operations. First the furnacing step and second the processing step in which alumina crystals produced in the furnacing step are freed without crushing for use as abrasive grits. In the furnacing step the following materials, namely, bauxite, reclaims, coke, and iron borings are mixed with iron pyrites and lime and fused in the usual manner. The presence of the iron pyrites and lime accomplish two objectives. It acts as a sort of intergranular sponge to soak up the undersirable titania-zirconia and iron which could not entirely be removed in a metal phase. It also allows the fused alumina to crystallize freely without interlocking into a massive structure. Those crystals are surrounded by a sprongy matrix envelope which is disintegrated by contact with water. This hydrolysis, which occurs on contact with water, converts the matrix to a plastic mud and frees the crystals. This behavior is caused by the presence of calcium and aluminum sulfides in the matrix.

Chemical reactions which occur during the furnacing step are as follows:

$$Fe_2O_3 + 3C \rightarrow 2Fe + 3CO$$
$$SiO_2 + 2C \rightarrow Si + 2CO$$
$$TiO_2 + 2C \rightarrow Ti + 2CO$$
$$Al_2O_3 + 3C \rightarrow 2Al + 3CO$$
$$Fe + Si + Ti + Al \rightarrow ReSiTiAl\ alloy$$

Additional reactions taking place are:

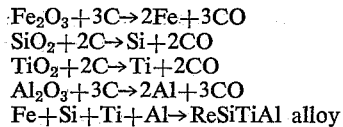

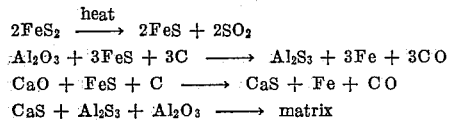

The theoretical power requirement for the furnacing operation wherein the above reactions take place, is 1.092 k.w.h./lb. crude product. The standard power requirement used in actual plant practice is 1.42 k.w.h./lb. product.

The matrix that has alreaody been mentioned is the spongy material surrounding the individual alumina crystals.

Before processing, the crude electric furnace product is crushed to lumps 2" or smaller in diameter. The processing is then conducted in a specially designed plant. During the processing the individual crystals in the crude product are freed by hydrolysis, scrubbed, water washed, acid treated, dried, magnetically treated. As a result of this complicated process, a number of by-products are produced. They are: A through 10 mesh oversize, fine alumina separated from the black mud by flotation cells, and magnetic grains removed by the magnetic separators. The excess sizes from the finished grain are reground. These reground grains are magnetically treated, water washed and mixed with the finished grains. The finished grains are then calcined. Each of the processing steps is accompanied by an appreciable loss.

A crystalline form of alumina may also be prepared by simply fusing a relatively pure form of alumina produced from bauxite by the well-known Bayer process. After cooling, the solid mass of fused alumina is crushed and screened to separate the several groups of sizes of particles produced.

It is proven necessary, commercially, to produce crystalline alumina in various forms by various methods such as described above. Since the processes differ, the products also differ in material respects and commercial demand has arisen for several different forms of aluminous abrasive material.

The form of high purity alumina described above produced by the fusion of bauxite with iron borings, coke, and iron pyrites and subsequent mechanical and chemical processing is an important abrasive material for certain applications. The processing is relatively expensive, however, because of the high power requirements of the electrical furnace, the careful control of raw material compositions and the complicated mechanical, magnetic and chemical processing required to produce a salable product.

It is therefore an object of this invention to produce a high purity crystalline alumina by a method which is more efficient than prior art practice.

It is a further object to produce a high purity crystalline alumina by a process which results in a purer furnace product with less waste and processing steps than the prior art methods.

It is still a further object to produce a crystalline alumina by a process which is particularly adaptable to operation in a casting furnace whereby control of crystallization of the product may be more easily effected than in prior art processing.

In the process of this invention, a purified alumina such as Bayer process alumina is employed as the basic raw material. This material is 99% or more $Al_2O_3$, 0.6% or less soda and the remainder being primarily traces of Fe, Si and Ti in the form of oxides. Any alumina of 97.5% or more $Al_2O_3$, 1% or less soda, and the remainder being primarily traces of Fe, Si and Ti in the form of oxides can be used.

In order to form a product in which most if not all of the abrasive particles are single crystals instead of crystal aggregates, a matrix is produced in which the high purity alumina crystals can grow and from which they can be easily separated and recovered.

In the present invention the matrix consists mainly of aluminum sulfide, and finely divided Al₂O₃. This matrix serves as a suitable disintegrating agent. It is formed by the addition of elemental sulfur and carbon to the alumina prior to fusion. The present method eliminates the introduction of the metal phase which the iron-sulfide introduces in the old process. No alkaline earth metals are required in my invention to promote disintegration.

The conditions described are achieved by mixing elemental sulfur and carbon, in controlled amounts with the purified alumina. The premixed batch is fed, at a controlled rate, to an electric arc furnace which may be a batch furnace of the Higgins type or may be a casting furnace such as disclosed in U.S. Patent #2,579,885 to Upper and U.S. Patent #2,426,643 to Ridgway. A fast feed rate to the furnace is important to the success of the process. It is controlled to prevent loss of sulfur during fusion and insure that sufficient sulfides are left in the bath to form the soluble sulfide matrix. If the run is in a Higgins (batch) furnace, the product is cooled in the furnace and during cooling crystals of alumina are formed which are surrounded by a water decomposable sulfide matrix. The product made in a casting furnace is tapped into cast iron molds or insulated molds. I prefer to use the casting furnace in the furnacing operation and refer to the Higgins batch furnace as another way of carrying out the fusion. The use of the insulated molds in the casting operation is very significant in that we have a certain degree of control of the crystal size by variations in mold size and amount of insulation in the mold. Use of the casting furnace is particularly advantageous in that the product may be tapped into cast iron molds or insulated molds of predetermined size whereby a control of the crystal size of the product is achieved by control of the cooling rate. Careful control of the crystal size is very important in order to meet the requirements of the sales demand of the more predominant sizes.

A typical furnace mixture for this product would be:

| | Parts by weight |
|---|---|
| Alumina (Bayer process) | 100 |
| Elemental sulfur | 4 |
| Pitch coke | 1.5 |

A casting furnace, termed a 1,000 pound casting furnace is used to carry out the fusion. The size of the furnace shell is designated by the approximate amount of material the furnace can hold. Two batches (211 pounds) of unfused mix are placed on top of a prefused bottom in the furnace shell. A graphite rod is placed on top of the mix to start the furnace. The furnace is started and operated at 120 volts and the power is maintained at 240 kw. When the furnace is started and takes the load, the graphite rod is removed and more mix is fed to the furnace. The feed rate is fast, 1.47 pounds per kilowatt hour, in order to maintain a sufficient blanket of unfused mix over the molten bath. This blanket prevents the escape of sulfur which is necessary in the reaction to form the decomposable matrix. After the furnace has operated for a few hours and when sufficient bath is available, the molten alumina is tapped into an insulated mold. The mold is covered with more alumina insulation and allowed to cool for two to four days. When the mold is cooled, the insulation is removed from the mold and the ingot is broken in pieces and crushed to a size of 2 inches and smaller. The product is slaked with water for 20 hours. When the slaking cycle is completed, the product is thoroughly washed with water and dried; the product is then screened through a 4 mesh screen. Material passing through the 4 mesh screen is considered as decomposed material. The percent decomposition is calculated as follows:

$$\frac{\text{Lbs. T-4 material} + \text{lbs. loss} \times 100}{\text{Orig. wt. of sample}}$$

Although I prefer to employ a casting furnace, a batch furnace (Higgins) may also be employed as illustrated by the data of Table 1 which lists the results for three furnace runs.

TABLE 1

| Example Number | 1 | 2 | 3 |
|---|---|---|---|
| Type of Furnace | Higgins (batch) | Higgins (batch) | Cast furn. |
| Mix, lbs.: | | | |
| A-1 alumina (Bayer) | 100 | 100 | 100 |
| Elemental sulfur | 4.5 | 4 | 4 |
| Pitch coke | 1.75 | 1.5 | 1.5 |
| Length of run, hrs | 4.08 | 3.08 | 4.17 |
| Bottom batch, lbs | 319 | 317 | 211 |
| Feed to fce., lbs | 850 | 844 | 1,477 |
| Total feed, lbs | 1,169 | 1,161 | 1,688 |
| Ave. feed to fce., lbs./hr | 208 | 274 | 356 |
| Voltage | 112 | 112 | 120 |
| Total kwh | 627 | 400 | 1,005 |
| Average kw | 153 | 149 | 241 |
| Lbs. mix/kwh | 1.36 | 2.11 | 1.47 |
| Percent decomposition | 78.2 | 99.8 | 97.8 |

Total feed, e.g., 1169 lbs., is made up from the amount placed in the bottom of the furnace (319 lbs.) before the furnace is started up and the amount charged to the furnace (850 lbs.) during the run. Only the material fed to the furnace during the run is used in calculating the feed rate.

The three runs cited above illustrate the importance of a fast feed rate in order to obtain good decomposition (≅90%).

The chemical reactions which occur during the furnacing operation are as follows:

$$Al_2O_{3(L)} + 3C_{(S)} + 3S_{(g)} \rightarrow Al_2S_{3(L)} + 3CO_{(g)} \quad (1)$$
$$2Al_2O_{3(L)} + 6C_{(S)} + 3S_{2(g)} \rightarrow 2Al_2S_{3(L)} + 6CO_{(g)} \quad (2)$$

We know that sulfur, at a reaction temperature of 2000° C., is not a solid. Therefore, the reaction can be described by Equation 1 or Equation 2, or both. Thermodynamically, one would favor Equation 2 as the reaction mechanism. It has been found that for good decomposition, 8-13% by volume of matrix ($Al_2S_3$) is required.

Assuming Equation 2 describes the reaction mechanism involved in the furnacing operation, we have calculated that the theoretical power requirement to carry out the reaction would be 0.493 kwh./lb. crude product. In actual plant practice the power requirement would of course be higher.

Theoretically and practically it is possible to form sufficient matrix and hence a decomposable product without the addition of coke to the furnace mix according to the following equation, $$2Al_2O_3 + 9S \rightarrow 2Al_2S_3 + 3SO_2$$

However, the amount of sulfur required for good decomposition is higher and hence would make the process more expensive.

When the mixture described previously is fused in either type of furnace as described earlier, the product after cooling is separated into individual grains by leaching with water. The crystals are then washed with water and dried. When this operation is complete the grains are ready for processing into wheels. Since no metal phase is present in the furnace operation, costly magnetic treatment is eliminated. In addition, expensive chemical treatment is eliminated.

Table 2 shows the physical and chemical properties of the product from some sample runs. In Table 3, the synthetic product is compared with product made by bauxite reduction and further treated with acid or chlorination.

TABLE 2

*Sulfur series*

[Slaked grains [1]]

| Example No | (3) | (4) | (5) | (6) | (7) |
|---|---|---|---|---|---|
| Percent: | | | | | |
| $SiO_2$ | .05 | .02 | .04 | .02 | .03 |
| $Fe_2O_3$ | .17 | .07 | .12 | .11 | .09 |
| $TiO_2$ | .02 | .37 | .02 | .02 | .02 |
| Total S | .17 | .19 | .21 | .14 | .21 |
| $Al_2O_3$ | 99.59 | 99.35 | 99.61 | 99.71 | 99.6 |
| S.S. $TiO_2$ | | .17 | | | |
| Agar (60 grit) | 0 spots | 10 spots | 4 spots | 3 spots | 3 spots |
| Thermal growth (60 grit) | .0002 | .0001 | .0001 | .0001 | .0000 |
| Crude Color (46 grit): | | | | | |
| Lightness | 60.7 | 43.2 | 51.7 | 62.6 | 57.8 |
| Yellowness | 5.9 | 2.7 | 4.2 | 6.7 | 5.1 |
| Greenness | .4 | −.4 | −.4 | 0.3 | 0.5 |
| Hunter Reflectometer used to measure crude color, w.p.c.f. (46 grit): | | | | | |
| T44 ob 54 | 115.75 | 115.8 | 110.5 | 114.9 | 115 |

[1] Grains for the above runs were slaked with water, water washed and dried. No further treatment was required.

TABLE 3

| Description | Sulfur Series | | Prior art standard product from bauxite-pyrites fusion |
|---|---|---|---|
| | No titania | ⅜% titania | |
| Treatment | Slaked with water | | Acid treated |
| Percent: | | | |
| $SiO_2$ | .02 | .04 | .07 |
| $Fe_2O_3$ | .13 | .15 | .29 |
| $TiO_2$ | .01 | .31 | .69 |
| Total S | .10 | .14 | .10 |
| $Al_2O_3$ | 99.74 | 99.36 | 98.85 |
| S.S. $TiO_2$ | | .13 | .16 |
| Agar (60 grit) | 2 spots | 3 spots | 10 spots |
| Thermal growth [1] (60 grit) | +.0001 | .0001 | .0140 |
| Crude color (46 grit): | | | |
| L | 57.9 | 47.6 | 49.7 |
| Y | 5.1 | 5.0 | 5.7 |
| G | −0.6 | −.2 | −1.3 |
| W.p.c.f.[2] (46 grit) | 115.75 | 117. | 118.85 |

[1] Maximum limit of .0007.
[2] Weight per cubic foot (standard, 115–121 lb./cu. ft.).

The first two columns in Table 3 are products made according to the present invention and are higher in purity (per cent $Al_2O_3$) than the standard product in the third column. The grains are well within the agar specification of 20 spots and show no thermal growth. The standard product requires calcination in order to eliminate grain growth. The w.p.c.f. is within the standard specification for 46 grit (115–121 lbs./cu. ft.).

Titania, $TiO_2$, in the form of rutile, can be added to the mix, up to about 1.5% by weight. The product made without rutile addition is colorless and is weaker in impact strength than when rutile is added. A light pink color results from the addition of rutile and lime. The degree of color will depend upon the amount of $TiO_2$ which is in solid solution in the alumina crystals.

Lime, up to 0.5% by weight, may be present in the mix, ending up as a soluble sulfide in the matrix.

The amount of elemental sulfur should be sufficient to provide a readily decomposable matrix from which the alumina crystals may be easily recovered. As little as 2% by weight of sulfur addition will result in formation of a soluble matrix; however, 4% sulfur addition is preferred, and I may add as much as 10% sulfur to the mix if no carbon or a deficiency of carbon is employed. The addition of more sulfur than this is both unnecessary and uneconomical in that more sulfur is used up and the yield of alumina crystals decreases.

As indicated above, although it is preferable that carbon be employed with sulfur (0.375±30% pounds of carbon per pound of sulfur), if sufficient sulfur is employed, the carbon addition may be dispensed with. Theoretical considerations and practical results indicate, however, that the optimum conditions are achieved when carbon and sulfur are both present to react on the basis of the following equation, $$Al_2O_3 + 3S + 3C \rightarrow Al_2S_3 + 3CO$$

to yield the required amount of matrix to insure good decomposition ($\geq 90\%$).

Although conditions may vary somewhat depending upon the type of furnace employed, generally I have found that, at a minimum feed rate of 1.3 pounds of feed per kilowatt hour a sufficient blanket of unfused material is maintained over the fused material at all times. Maintenance of this blanket is essential to ensure that the concentration of the sulfur in the molten bath is sufficiently high to permit formation of the sulfides to produce the desired product (cast ingot or Higgins pig) upon cooling of the molten material.

When a casting furnace is employed in the process of this invention it has been found that when the individual casting is in an uninsulated mold of 300 pounds capacity or smaller, good decomposition of the material to free the crystals from the matrix is not achieved.

I claim:

1. The method of forming high purity coarsely crystalline alumina grains suitable for abrasive purposes from Bayer process alumina comprising fusing a mixture of Bayer process alumina containing at least 97.5% alumina and not more than 1% soda by weight with from 2% to 10% by weight, of said Bayer process alumina, of elemental sulfur, preventing the escape of sulfur from the fused mixture by maintaining a sufficient blanket of unfused mix over the reaction whereby aluminum sulfide is formed, cooling the fused mass whereby alumina crystals are formed, and separating the alumina crystals from aluminum sulfide by decomposing said aluminum sulfide with water.

2. The method of claim 1 wherein the reaction mixture contains carbon in the amount of from 0.26 to 0.49 pound of carbon per pound of sulfur.

3. The method of claim 1 wherein the reaction mixture contains up to 1.5% titania.

4. The method of claim 1 wherein the reaction mixture contains up to 0.5% calcium oxide.

5. The method of claim 1 wherein the mixture is continuously fed to an electric arc furnace at an average rate of at least 1.3 pounds of feed per kilowatt hour of power input to said furnace.

6. The method of claim 5 wherein sufficient sulfur is reacted in the cooled furnace product to provide at least 8% by volume of metal sulfides.

References Cited by the Examiner

UNITED STATES PATENTS

| Re. 17,001 | 6/28 | Haglund | 23—142 |
| Re. 20,547 | 11/37 | Ridgway | 23—142 |
| 760,554 | 5/04 | Onda | 23—142 X |
| 1,245,383 | 11/17 | Richmond | 23—142 |
| 2,000,857 | 5/35 | Masin | 23—142 X |

MAURICE A. BRINDISI, *Primary Examiner.*